United States Patent [19]

Ng et al.

[11] Patent Number: 5,236,307
[45] Date of Patent: Aug. 17, 1993

[54] VARIABLE GEOMETRY ROTORS FOR TURBO MACHINES

[75] Inventors: Dik H. Ng, St. Annes on the Sea; Robert G. Marshall, Taunton, both of England

[73] Assignee: Rolls-Royce plc, London, England

[21] Appl. No.: 912,746

[22] Filed: Jul. 13, 1992

[30] Foreign Application Priority Data

Jul. 27, 1991 [GB] United Kingdom ............... 9116290

[51] Int. Cl.$^5$ .............................................. F01D 7/00
[52] U.S. Cl. .................................. 416/147; 416/124; 416/198 A; 416/223 A; 415/148
[58] Field of Search ............... 416/120, 121, 122, 124, 416/130, 147, 186 A, 198 a, 200 R, 223 R, 223 A; 415/149.2, 148, 160, 161, 164, 165, 166

[56] References Cited

U.S. PATENT DOCUMENTS

| | | | |
|---|---|---|---|
| 2,648,390 | 8/1953 | Lagabbe | 416/147 |
| 3,442,493 | 5/1969 | Smith, Jr. | 415/161 |
| 3,606,579 | 9/1971 | Mehus | 416/200 A |
| 3,867,062 | 2/1975 | Troller | 416/200 A |
| 4,874,289 | 10/1989 | Smith, Jr. | 415/161 |

FOREIGN PATENT DOCUMENTS

| | | |
|---|---|---|
| 1085390 | 9/1967 | United Kingdom . |
| 1124929 | 8/1968 | United Kingdom . |
| 1378346 | 12/1974 | United Kingdom . |
| 2049832 | 12/1980 | United Kingdom . |

Primary Examiner—Edward K. Look
Assistant Examiner—Michael S. Lee
Attorney, Agent, or Firm—James A. Oliff

[57] ABSTRACT

There is provided a rotor arrangement comprising primary blades 16 mounted on a support disc 15 and secondary blades 18 mounted on a support disc 17. The secondary blades are disposed between respective primary blades with some axial overlap. The set of secondary blades is movable relative to the set of primary blades so that each secondary blade can be moved between end positions abutting the associated pair of primary blades.

17 Claims, 8 Drawing Sheets

VARIABLE GEOMETRY ROTORS FOR TURBO MACHINES

This invention relates to rotors for turbo machines.

BACKGROUND OF THE INVENTION

It is well known that the geometry, for example the shape, size and position, of the blades of a rotor of a turbo machine has a significant effect on the performance and efficiency of the machine.

According to the present invention, there is provided a rotor arrangement for a turbo machine which rotor arrangement comprises an annular series of spaced primary blades mounted for rotation on a shaft, and an annular series of spaced secondary blades, also mounted for rotation on said shaft, at least part of each of the secondary blades being disposed between a successive pair of primary blades, so as to effect at least partial axial overlap between the two series of blades, the arrangement being such that the series of secondary blades is movable relative to the set of primary blades between two predetermined end positions.

SUMMARY OF THE INVENTION

Preferably the end positions of each secondary blade are abutting the respective primary blades between which the secondary blade is disposed, thereby to define two forms of composite blades.

In one arrangement the primary blades are mounted on a support member. Conveniently, the secondary blades are mounted on a second support member mounted for rotation on said shaft, said second support member being rotatable relative to the first support member to effect the relative movement between the primary and secondary blades.

In preferred arrangements the secondary blades do not project behind the trailing edges of the primary blades. Also the secondary blades do not project forward of the leading edge of the primary blades.

In further preferred arrangements the position of the secondary blades relative to the primary blades alters the exit angle of the rotor but not the inlet angle of the rotor.

Preferably the angular spacing between successive blades is equal.

According to a preferred arrangement, the radially extending sides of the overlapping portions of the composite blades are parallel. Also the thickness of the parallel portions of the composite blades increases with the distance from the axis of rotation of the blades.

In one arrangement the first support member is mounted on axial splines on the shaft and the second support member is mounted on helical splines on the shaft, axial movement of the two support members thereby resulting in the relative movement between the two support members. Conveniently, the support members are held in a downstream position so that release of the locking mechanism allows the support members to move upstream as a result of aerodynamic and inertial forces.

In another arrangement one support member is securely mounted on the shaft and the other support member is mounted for free rotation on the shaft and is held in one end position by locking means which when unlocked allows said other support member to move relative to the first support member into its other end position. Preferably this movement is the result of aerodynamic and inertial forces In one preferred arrangement the locking means comprises a locking pin controlled by a solenoid arrangement.

In other arrangements, spring or piston means are disposed between the two support members so as to move one relative to the other.

Relative movement between the two support members could be terminated by the abutting of the two sets of blades. Alternatively links of a predetermined length could be provided between the two support members.

Embodiments of the invention will now be described in more detail. The description makes reference to the accompanying diagrammatic drawings.

DESCRIPTION OF THE PREFERRED EMBODIMENTS

Figure 1:
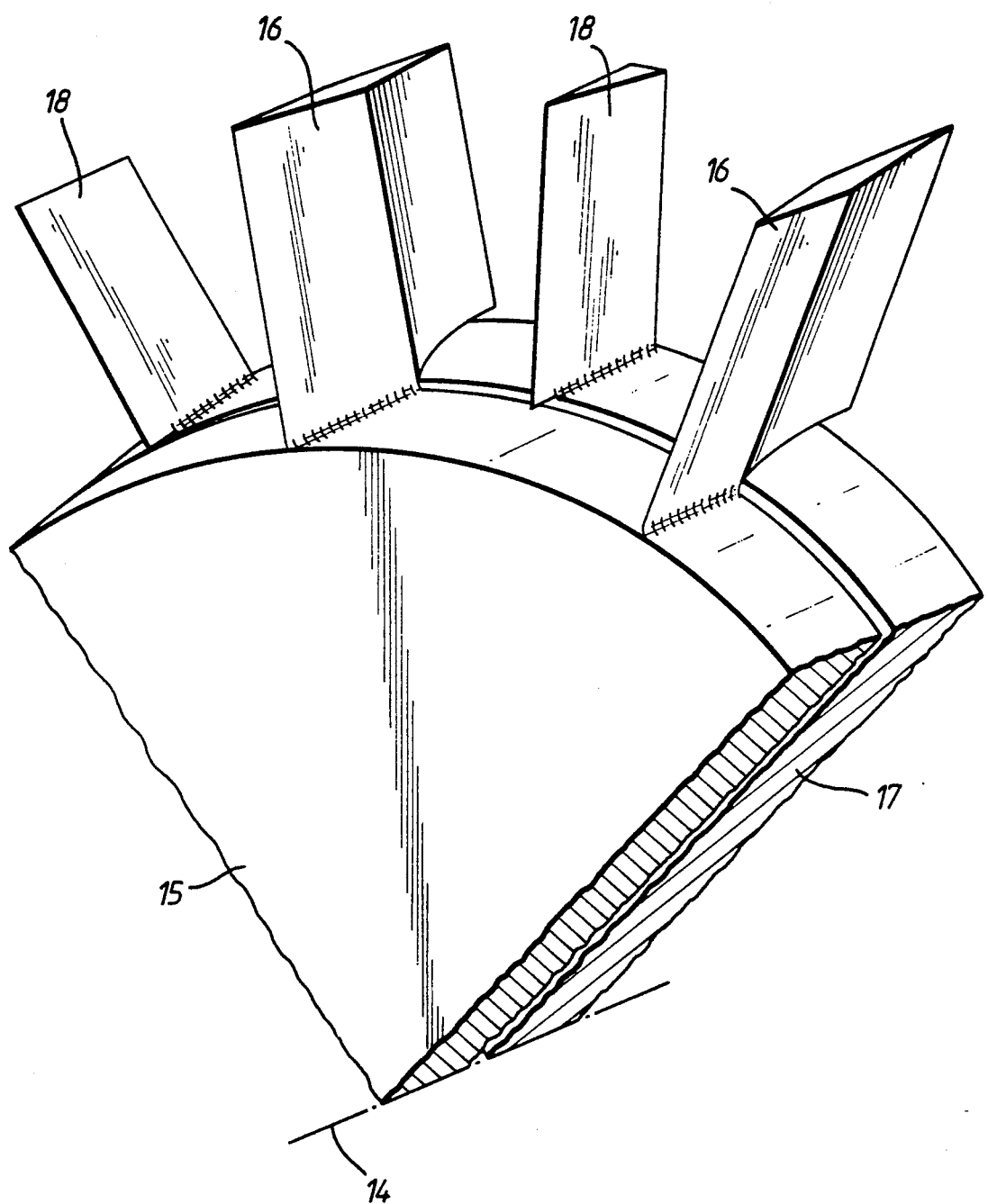
FIG. 1 is a front perspective view of a rotor arrangement according to the present invention.
Figure 2:
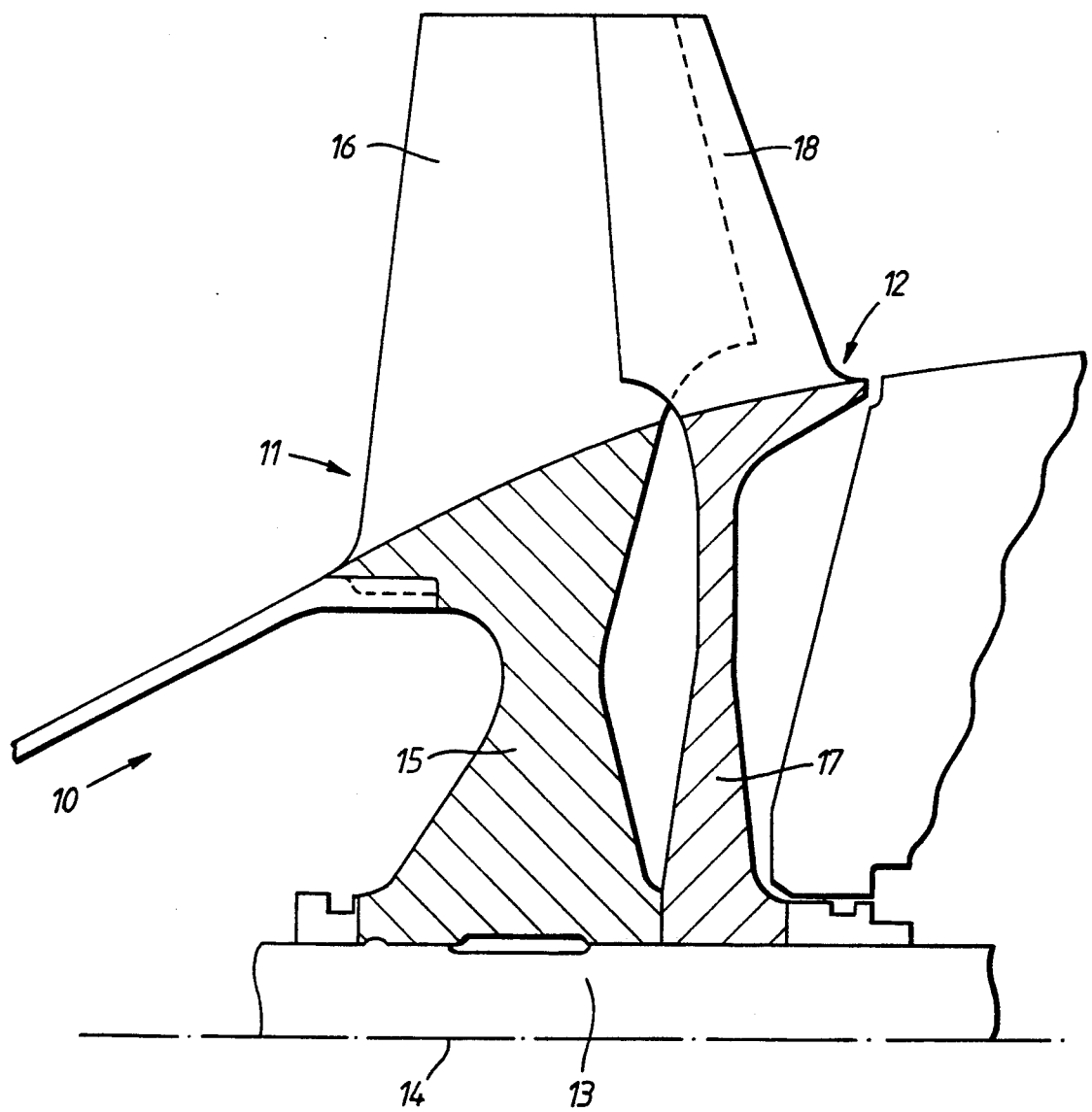
FIG. 2 is an axial sectional view of a rotor arrangement similar to that shown in FIG. 1.

FIGS. 1 and 2 show a rotor arrangement 10 which could be for any turbo machine such as a compressor or a turbine although the rotor arrangement 10 is particularly suitable as a 'fan' stage or low pressure compressor stage. The arrangement 10 comprises a primary or front rotor 11 and a secondary or rear rotor 12 both mounted on a shaft 13 for rotation about the center-line 14 of the machine.

The front rotor 11 comprises a support member in the form of a disc and a series of blades 16 extending generally radially from the front disc 15 at equal angular spacings.

The rear rotor 12 comprises a support member 17 in the form of a disc and a series of blades 18 extending generally radially from the rear disc 17 at equal angular spacings. The front blades 16 and the rear blades overlap in an axial direction and are arranged so that they interleave, each rear blade 18 being disposed between a pair of adjacent front blades 16.

The two rotors 11, 12 are arranged so that the rear rotor 12 is capable of a predetermined amount of rotation about the center-line 14 relative to the front rotor 11. The predetermined amount of rotation is such that the rear blades 18 can move between two positions, one abutting one front blade 16 of the pair of blades 16 between which it is disposed and the other abutting the other front blade 16 of said pair. The rotor arrangement therefore has variable geometry.

Figure 3:
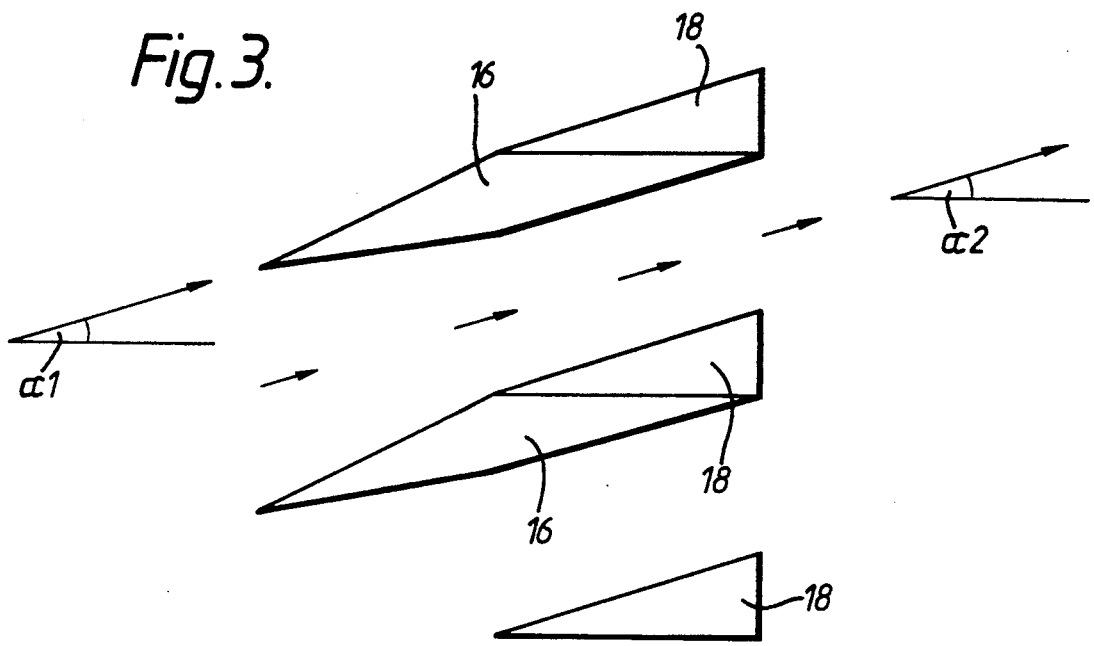
FIG. 3 is a schematic sectional view of a number of rotor blades in a rotor arrangement according to the present invention.
Figure 4:
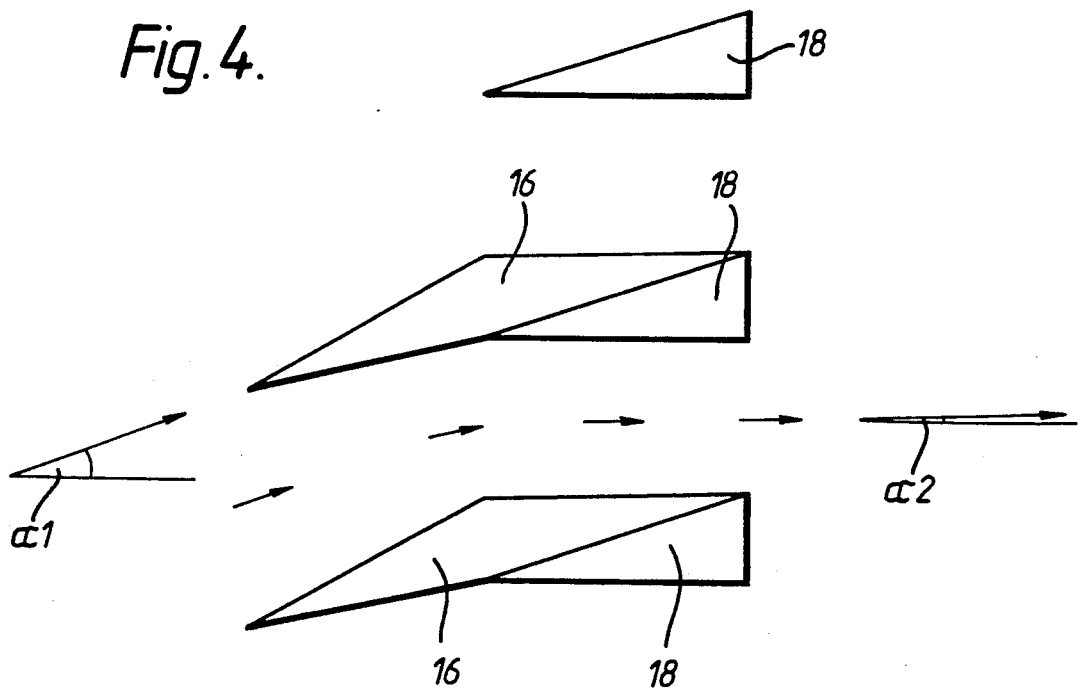
FIG. 4 is a schematic sectional view of the rotor blades shown in FIG. 3 in alternative positions.

This variable geometry concept is more clearly shown in FIGS. 3 and 4 which shows a pair of front blades 16 with the co-operating rear blades 18. The blades 16 and 18 are shown in exaggerated, simplified form for ease of understanding and explanation. Clearly the composite blades shown in these two figures are of different shape and so the work which can be done by each blade can be exchanged. The rear blades overlap the trailing edges of the front blades and the angle of whirl of the air leaving the rotor stage is different in the two positions although the inlet angle of the stage remains the same.

It can be shown that the specific work of the rotor stage is proportional to (Tan $\alpha 2$ − Tan $\alpha 1$) where $\alpha 2$ is the exit air angle and $\alpha 1$ is air angle. These angles are defined as the angles subtended with the machine axis by the aerofoil profile meanline, or tangent thereto, at the trailing and leading edges respectively, where the meanline is the locus of points equidistant between the suction and pressure surfaces of the aerofoil. To illustrate the effectiveness of the variable geometry concept let us take the inlet angle to be a constant 12° and the blades and 42° in the other positions of the rear blades. Calculation shows a 31% increase in specific work when the exit angle is changed to 48°.

Even with a change in exit angle from 44° to 46° there is an increase of 9° in specific work.

It will be evident that there are many ways of achieving the relative motion between the front and rear rotors 11, 12. Some examples are described below.

Figure 5:
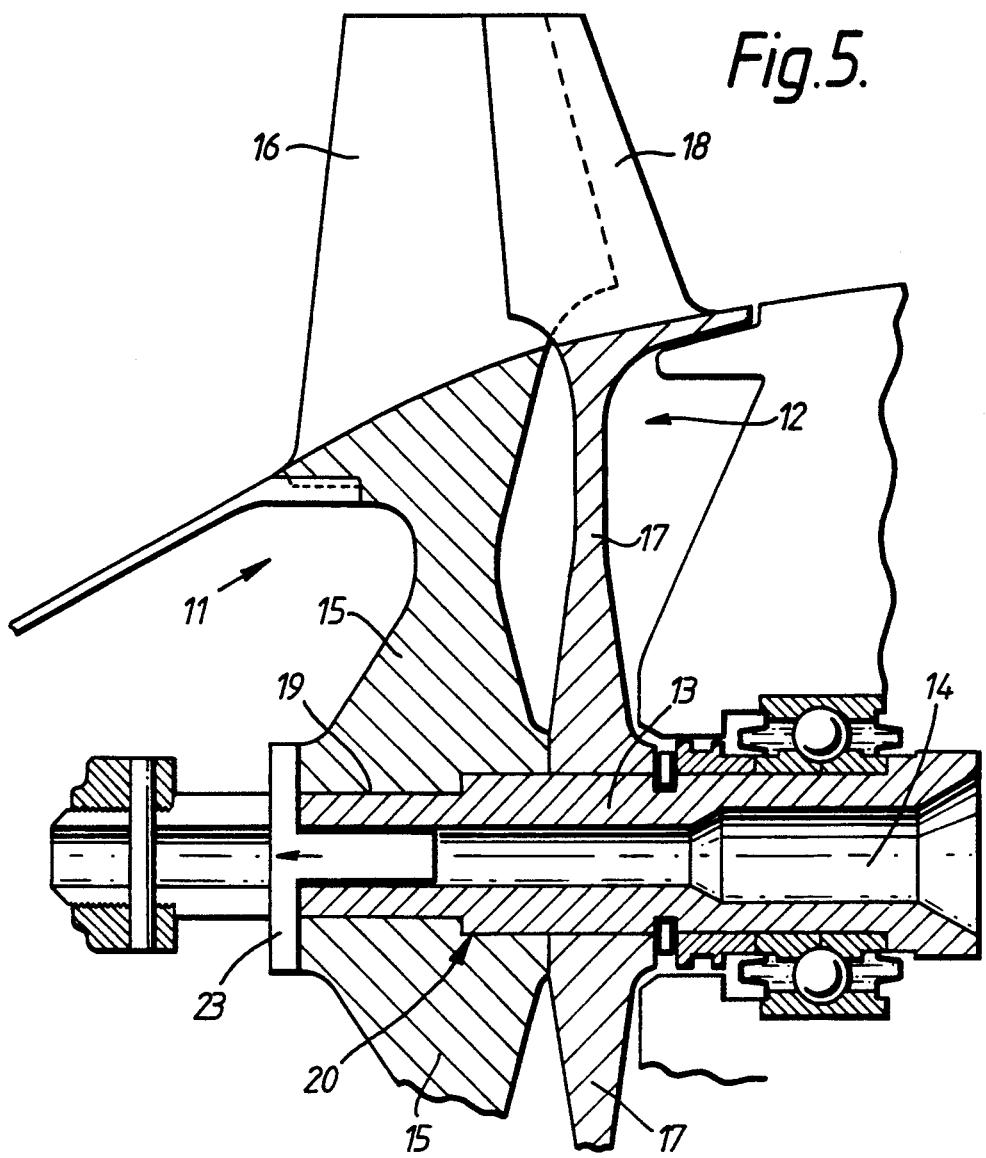
FIG. 5 is an axial sectional view of a rotor arrangement according to the present invention.
Figure 6:
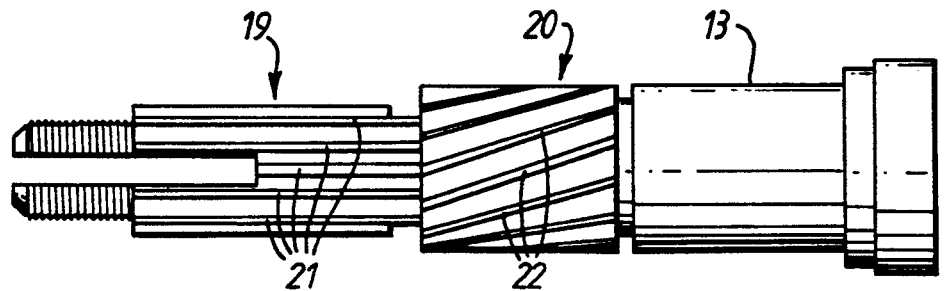
FIG. 6 is a plan view of the mounting shaft of the arrangement in FIG. 5.

In FIGS. 5 and 6, the shaft 13 is provided with two sections 19, 20. The front section 19 carries the front rotor 11 on straight axial splines 21 and the rear section 20 carries the rear rotor 12 on helical splines 22. If the pair of rotors 11, 12 are caused to move axially along the shaft, the rear rotor 12 will rotate relative to the front rotor 11.

The rotors 11, 12 could be held in their downstream locking positions by some form of locking mechanism which can be released to allow the rotors to move in the upstream direction under aerodynamic and inertial forces thus effecting the relative rotation between the rotors. Alternatively, a cross-shaped member 23 is provided to restrain the rotors in one position and is moved by a lead screw or a fluid pressure piston to the other position.

Figure 7:
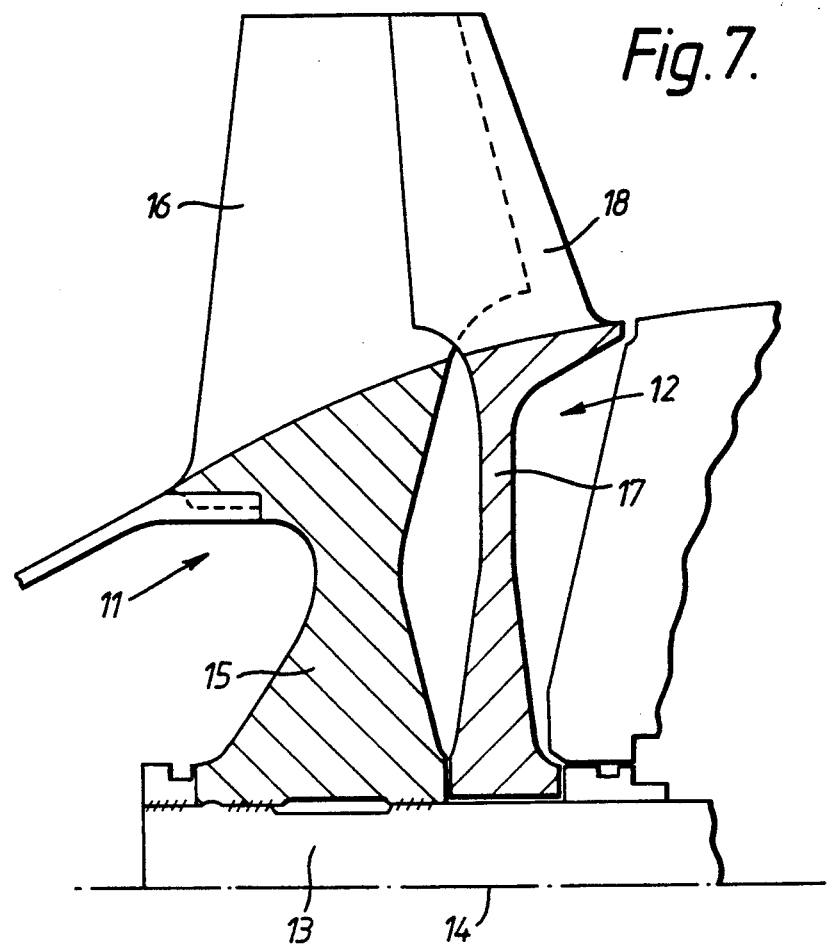
FIG. 7 is an axial sectional view of another rotor arrangement according to the present invention.

In FIG. 7 the front support member 15 is rigidly fixed to the shaft but the rear support member 17 is freely mounted for rotation on the shaft 13. The rear support member 17 is held in its first position relative to the front support member 15 by a locking pin (not shown) or similar device. The pin can be controlled by a solenoid so that when the support member is released, it rotates about the shaft relative to the first support member 15 until the rear blades 18 abut the front blade 16 in the second position. The relative rotation is effected by aerodynamic and inertial forces. The position change is however one-way.

Figure 8:
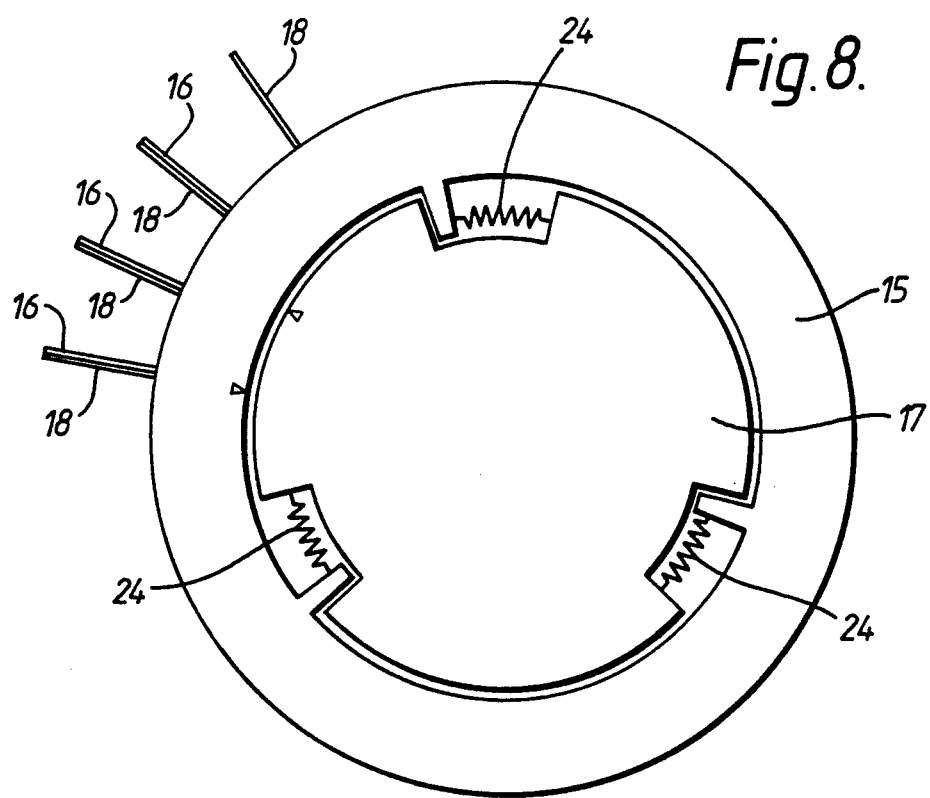
FIG. 8 is an axial view of a further rotor arrangement according to the present invention.

FIG. 8 shows part of the front support member 15 together with its blades 16 and the rear support member 17 arranged with springs 24 between them. When a locking mechanism is released the force of the springs 24 causes the relative rotation between the front and rear rotors 11, 12. It will be appreciated that pistons could replace the springs 24 and the pistons, if double-acting, could also replace any locking mechanism and reverse the relative rotation.

Figure 9:
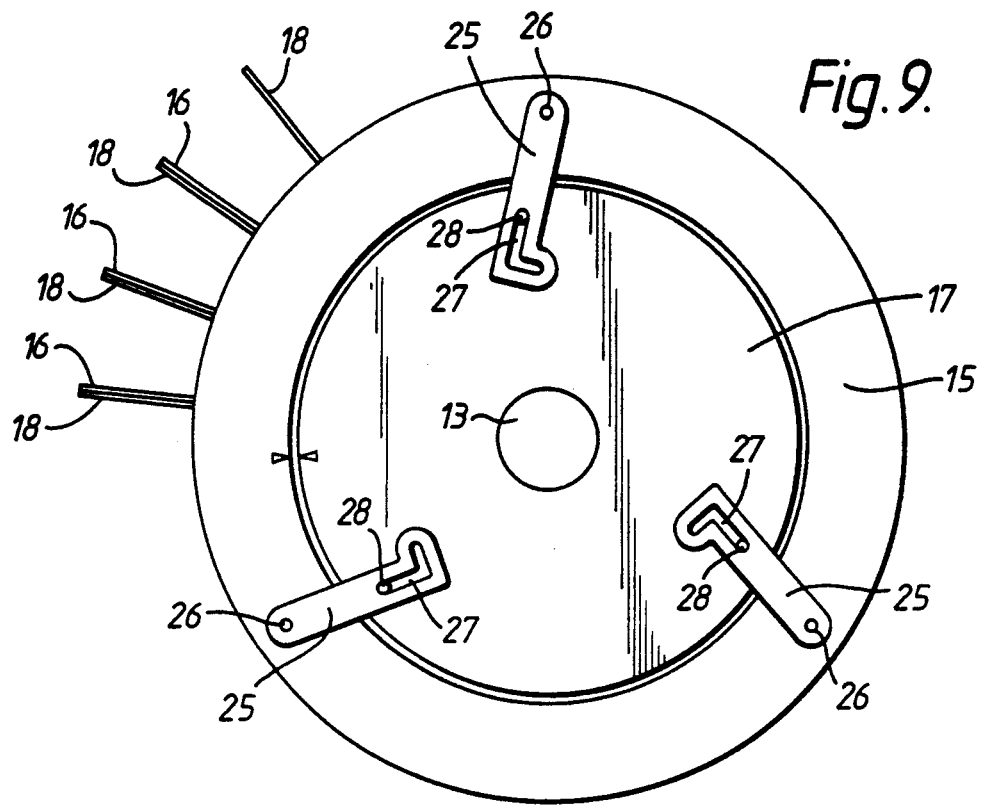
FIG. 9 is an axial view of another rotor arrangement according to the present invention.
Figure 10:
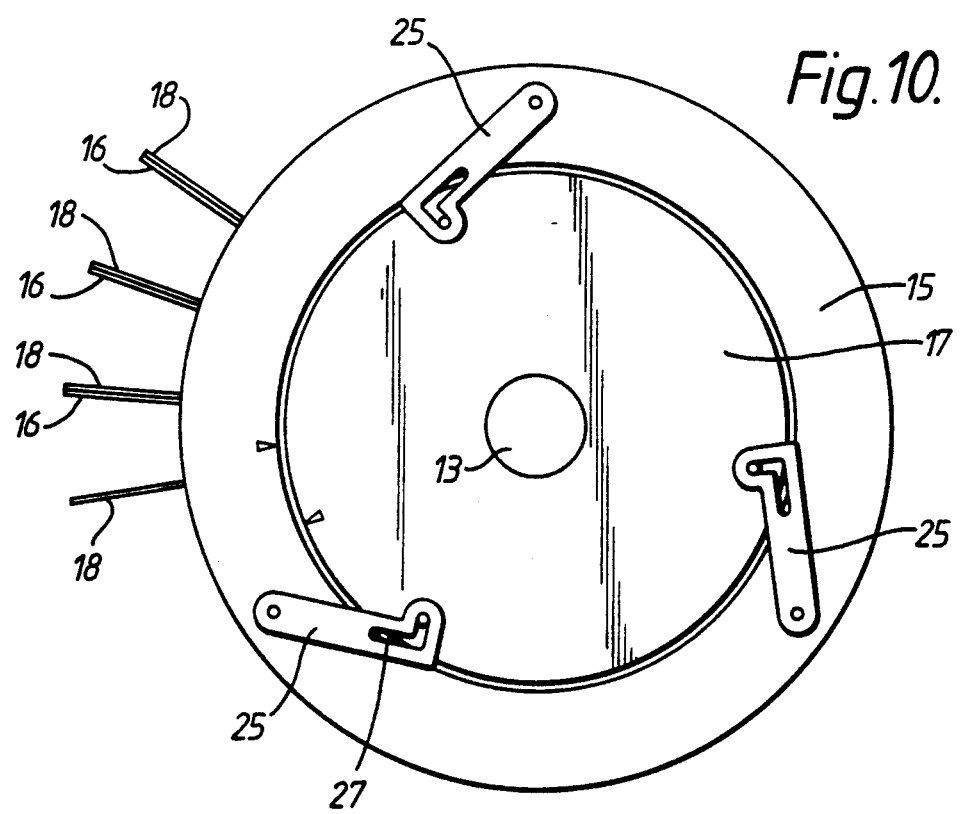
FIG. 10 is an axial view of the FIG. 9 arrangement with the rotor blades in alternative positions.

FIGS. 9 and 10 show front and rear support members 15, 17 which are mounted on the shaft 13. The members 15, 17 are interconnected by arms 25 mounted on pins 26 on the front support member 15 and have slots 27 for receiving guide pins 28 mounted on the rear support member 17. When a locking mechanism is released, centrifugal action as well as aerodynamic and inertial actions will cause the relative rotation between the two rotors 11, 12. The rotating is of course limited by the arm/slot lengths, and will correspond to the angular distance between the blades.

The above embodiments describe only axial flow machines, but it will be appreciated that the concept could be readily applied to radial flow machines.

Figure 11:
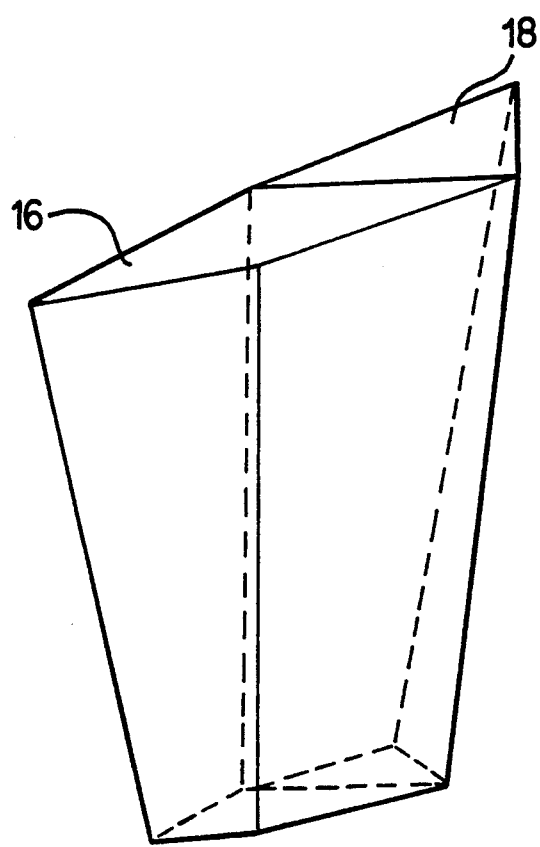
FIG. 11 is a schematic sectional view of an alternative embodiment of the present invention having a parallel sided composite portion formed by two rotor blades each of which has an increasing thickness with increasing distance from the radial center-line.

There are of course other features of blade design, apart from those mentioned above, which will affect the performance of the rotor. For example, it has been found that it can be advantageous if the composite portion formed by a pair of blades is parallel sided. The thickness of one or both blades should increase with radial distance from the machine centre line as shown in FIG. 11 if gaps between the blades are to be avoided. However, sometimes such gaps can be beneficial because air can bleed through the gap from the high pressure side of the blade to re-energize the boundary layer on the low pressure side. This reduces the tendency for the boundary layer on the low pressure side to break away from the surface. This break away marks a limit at which useful work can be done by or on an airflow.

Also the thickness/chord ratio of a blade, affects the performance because it is difficult to achieve large changes in the exit (or inlet) air angle with composite blades that are slender. Thin blades with low thickness/chord ratios do display improved performance but the improvement is not as significant as with thicker, more curved blades.

In addition, it has been found that increasing the stagger angle of the blades along their length can effectively increase the thickness of the overlapping portion of the composite blade and thus increases the turning effect on the airflow. (Stagger angle being the angle subtended by a line through the blade with respect to the meanline axis).

Figure 12:
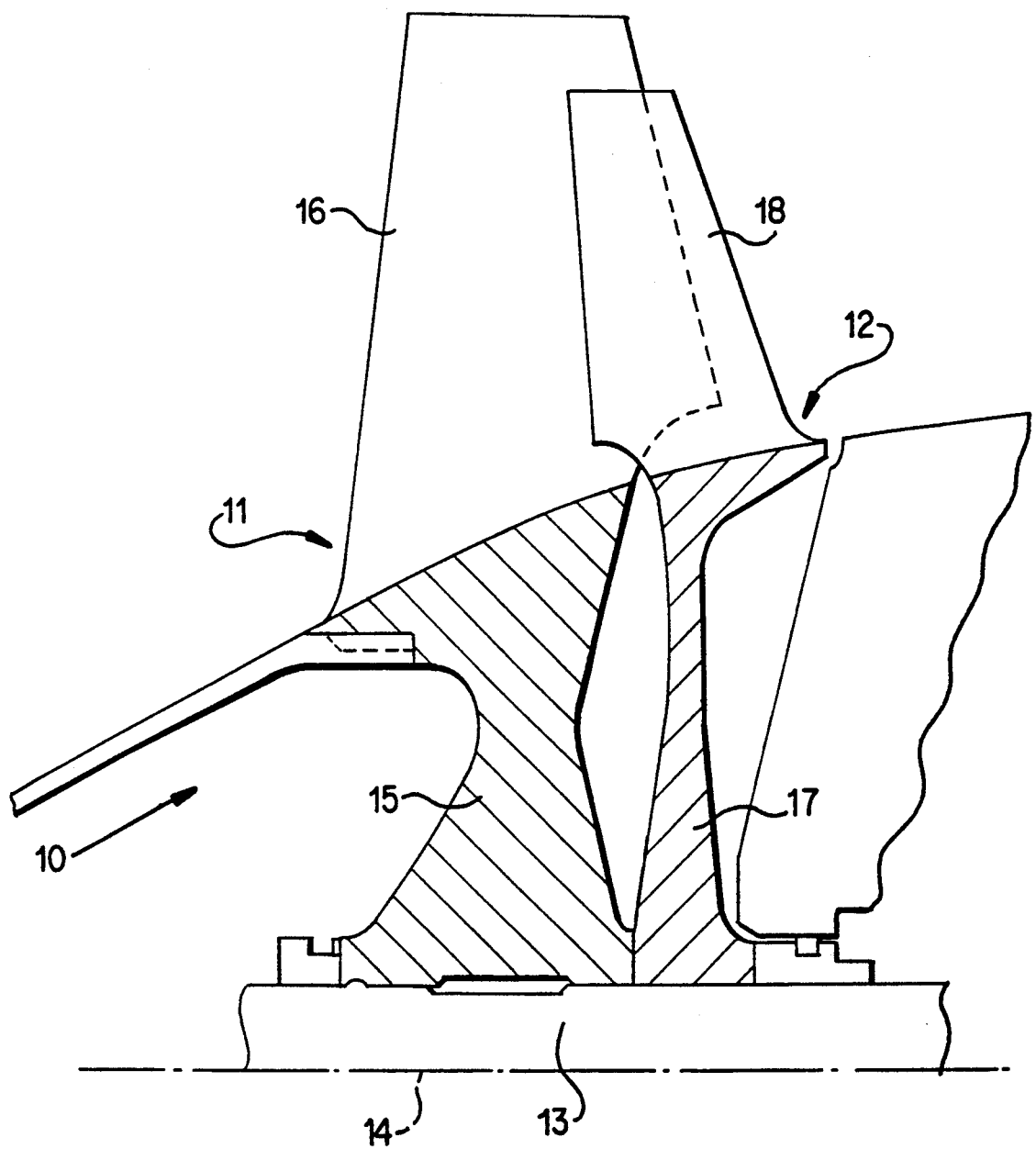
FIG. 12 is a schematic sectional vie of an alternative embodiment of the present invention having rotor blades of varying radial heights.

It is also possible that the radial heights of the primary and secondary blades may differ as shown in FIG. 12. Such an arrangement may be useful in a number of arrangements including where it is desired to vary the fan geometry to alter mass flow through a core engine only while maintaining fan duct or by-pass flow substantially constant.

The invention is useful in an engine the aerodynamic design of which is optimize for a cruise but where an alternative aerodynamic condition is better suited to another flight phase, for example take-off. The aerodynamics of the rotor stage in the first condition is designed for best performance during take-off or take-off and acceleration, and in the second configuration for best performance during cruise. The first configuration may be optimized for maximum power and the second for maximum economy Thus, the rotor would be locked in the first configuration initially and subsequently released or actuated to move to the second configuration during flight. Transition between alternative configurations should be momentary only.

We claim:

1. A rotor arrangement for a turbo machine, said rotor arrangement comprising:
   an annular series of spaced primary blades mounted for rotation on a shaft;
   an annular series of spaced secondary blades, also mounted for rotation on said shaft;
   at least part of each blade of the series of secondary blades being disposed between a respective pair of adjacent primary blades so as to effect at least partial axial overlap between the two series of blades;
   wherein the series of secondary blades is movable relative to the series of primary blades between two predetermined end positions, wherein in a first of said end positions, each of the secondary blades abuts a first of said respective pair of adjacent primary blades and in a second of the end positions, each of the secondary blades abuts a second of said respective pair of adjacent primary blades, thereby to alternatively define two forms of composite blades.

2. A rotor arrangement as claimed in claim 2 wherein the primary blades are mounted on a support member.

3. A rotor arrangement as claimed in claim 2 wherein the secondary blades are mounted on a second support member mounted for rotation on said shaft, said second support member being rotatable relative to the first support member to effect the relative movement between the primary and secondary blades.

4. A rotor arrangement as claimed in claim 1 wherein the secondary blades and the primary blades have trailing edges, and the two series of blades are disposed in an overlapping relationship such that the trailing edges of the primary blades are one of substantially level with the trailing edges of the secondary blades and behind the trailing edges of the secondary blades.

5. A rotor arrangement as claimed in claim 1 wherein the secondary blades and the primary blades have leading edges, and the two series of blades are disposed in an overlapping relationship such that the leading edges of the primary blades project forwardly of the leading edges of the secondary blades.

6. A rotor arrangement as claimed in claim 5 wherein the primary blades define a constant rotor inlet angle and the relatively movable secondary blades define an exit angle which is variable between a first value in the first end position and a second value in the second position.

7. A rotor arrangement as claimed in claim 2 wherein the angular spacing between successive blades is equal.

8. A rotor arrangement as claimed in claim 1 wherein overlapping portions of the primary and secondary blades have substantially radially extending sides and opposing faces of said overlapping portions are parallel.

9. A rotor arrangement as claimed in claim 8 wherein the blades have a thickness in the circumferential direction which increases with increasing radius whereby the opposing faces of said overlapping portions of the primary and secondary blades are parallel in the first end position and in the second end position.

10. A rotor arrangement as claimed in claim 1 wherein the primary and secondary blades are of different radial heights.

11. A rotor arrangement as claimed in claim 1 wherein the first support member is mounted on axial splines on the shaft and the second support member is mounted on helical splines on the shaft, axial movement of the two support members thereby resulting in the relative movement between the two support members.

12. A rotor arrangement as claimed in claim 11 wherein the support members are held in a downstream position so that release of the locking mechanism allows the support members to move upstream as a result of aerodynamic.

13. A rotor arrangement as claimed in claim 2 wherein one support member is securely mounted on the shaft and the other support member is mounted for free rotation on the shaft and is held in one end position by locking means which when unlocked allows said other support member to move relative to the first support member into its other end position.

14. A rotor arrangement as claimed in claim 13 wherein this movement is the result of aerodynamic and inertial forces.

15. A rotor arrangement as claimed in claim 14 wherein the locking means comprises a locking pin controlled by a solenoid arrangement.

16. A rotor arrangement as claimed in claim 13 wherein spring or piston means are disposed between the two support members so as to move one relative to the other.

17. A rotor arrangement as claimed in claim 1 wherein the primary and secondary blades are relatively movable during operation of the turbo machine whereby to alter its operating characteristics in use.

* * * * *